US010457242B2

(12) United States Patent
Shimizu et al.

(10) Patent No.: US 10,457,242 B2
(45) Date of Patent: Oct. 29, 2019

(54) AIR BAG DEVICE

(71) Applicant: Honda Motor Co., Ltd., Tokyo (JP)

(72) Inventors: Taro Shimizu, Wako (JP); Kohei Okimoto, Wako (JP); Yasuharu Ichikohara, Wako (JP); Yuki Kashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/459,401

(22) Filed: Mar. 15, 2017

(65) Prior Publication Data

US 2017/0267203 A1    Sep. 21, 2017

(30) Foreign Application Priority Data

Mar. 15, 2016  (JP) .................................. 2016-051501

(51) Int. Cl.
  *B60R 21/215*    (2011.01)
  *B60R 21/217*    (2011.01)
  *B60R 21/207*    (2006.01)

(52) U.S. Cl.
  CPC .......... *B60R 21/215* (2013.01); *B60R 21/207* (2013.01); *B60R 21/217* (2013.01);
  (Continued)

(58) Field of Classification Search
  CPC ............................. B60R 21/215; B60R 21/217
  See application file for complete search history.

(56) References Cited

U.S. PATENT DOCUMENTS 5,538,277 A * 7/1996 Frary .................. B60R 21/2171
                                                    280/728.2
5,741,024 A * 4/1998 Enders .................. B60R 21/217
                                                    280/728.3
(Continued)

FOREIGN PATENT DOCUMENTS

JP          9-39705 A      2/1997
JP          9-328050 A    12/1997
(Continued)

OTHER PUBLICATIONS

Office Action dated Jan. 9, 2018, issued in counterpart Japanese Application No. 2016-051501, with English translation (12 pages).
(Continued)

*Primary Examiner* — Paul N Dickson
*Assistant Examiner* — Joselynn Y Sliteris
(74) *Attorney, Agent, or Firm* — Westerman, Hattori, Daniels & Adrian, LLP

(57) ABSTRACT

An air bag device has an air bag body, a retainer, a lid member. The retainer has an inner space and a flange portion. The lid member has a base portion and a door portion. An opening portion has a shape with a pair of opposite sides which are facing each other. A dimension in the parallel direction to the opposite side is larger than a dimension in the orthogonal direction to the opposite side. The flange portion has longer side portions and shorter side portions. The longer side portions are fixed on the lid member with a fastening and fixing member in a fastened and fixed portion. The shorter side portions are positioned at the lid member in an engaging portion. The engaging portion has an engaging member, and an engaging hole into which the engaging member is inserted and engaged.

5 Claims, 7 Drawing Sheets

(52) U.S. Cl.
CPC ............... *B60R 2021/21525* (2013.01); *B60R 2021/21537* (2013.01)

(56) References Cited

U.S. PATENT DOCUMENTS

| | | | | |
|---|---|---|---|---|
| 7,530,599 B2* | 5/2009 | Williams | ............ | B60R 21/217 280/728.2 |
| 7,980,586 B2* | 7/2011 | Yamauchi | ............ | B60R 21/217 280/728.2 |
| 8,894,092 B2* | 11/2014 | Hayashi | ............ | B60R 21/205 280/728.2 |
| 10,246,040 B2* | 4/2019 | Elija | ............ | B60R 21/2176 |

FOREIGN PATENT DOCUMENTS

| | | | |
|---|---|---|---|
| JP | 10-119687 A | | 5/1998 |
| JP | 2004-345416 A | | 12/2004 |
| JP | 2008-80835 A | | 4/2008 |
| JP | 2011-31777 A | | 2/2011 |
| JP | 2014845 A | * | 1/2014 |
| JP | 2014-205390 A | | 10/2014 |
| JP | 2015-58727 A | | 3/2015 |
| WO | 2008105694 A1 | | 9/2008 |

OTHER PUBLICATIONS

Office Action dated Aug. 28, 2018, issued in counterpart Japanese Application No. 2016-051501, with English translation (8 pages).

* cited by examiner

AIR BAG DEVICE

CROSS-REFERENCE OF RELATED APPLICATION

This application claims priority of Japanese Patent Application No. 2016-051501 filed in Japan on Mar. 15, 2016, the entire contents of which are incorporated herein by reference.

TECHNICAL FIELD

The present invention relates to air bag device.

BACKGROUND OF THE INVENTION

For example, an air bag device for passenger seat of vehicle has a bag body, a retainer holding an inflator, and a lid member closing an opening portion of the retainer, and is arranged inside an instrument panel. When the impact is input, a bag body of the air bag device for passenger seat breaks an instrument panel and is deployed inside a vehicle interior, which protects passengers (see Japanese Laid-Open Patent Publication No. Hei 9-39705, Japanese Laid-Open Patent Publication No. Hei 10-119687, and Japanese Laid-Open Patent Publication No. Hei 9-328050).

According to the air bag device mentioned in Japanese Laid-Open Patent Publication No. Hei 9-39705, a case holding the air bag and a lid member are assembled by engaging an engaging leg of the lid member with an engaging hole of the case. According to the air bag device mentioned in Japanese Laid-Open Patent Publication No. Hei 10-119687, the air bag case and an instrument panel are assembled with bolts and nuts. According to the passenger protecting device mentioned in Japanese Laid-Open Patent Publication No. Hei 9-328050, the retainer is assembled with a lid by a hook.

SUMMARY OF THE INVENTION

According to the art mentioned in PATENT DOCUMENT 1, due to the fact that a case and a lid member require an adequate strength to endure the deploying operation of an air bag, the strength should be improved. According to the art mentioned in PATENT DOCUMENT 2, there is a problem that the assembling work of the air bag case is time-consuming. According to the art mentioned in PATENT DOCUMENT 3, when the vibration is added, it is needed to suppress the noise generated by a hook at an engaging position.

The present invention has been made under such circumstances, and aims to provide an air bag device in which a lid boy and a retainer are easily assembled, has a sufficient assembling strength, and also has less noise problem, as one of the purposes.

Means for Solving Problem

The invention mentioned in Claim 1 is characterized in that an air bag body (for example, a bag body 12 in the embodiment), a retainer (for example, a retainer 11 in the embodiment) containing the air bag body, and a lid member (for example, a lid member 14 in the embodiment) closing an opening portion (for example, an opening portion 20 in the embodiment) of the retainer are provided, the retainer has an inner space to house the air bag body therein (for example, an inner space 15 in the embodiment) containing the air bag body, and a flange portion (for example, a flange portion 16 in the embodiment) formed on a peripheral edge of the opening portion of the inner space, the lid member has a base portion (for example, a base portion 31 in the embodiment), and a door portion (for example, a door portion 32 in the embodiment) pivotally connected to the base portion, the opening portion has a rectangular shape such that the pair of opposite sides (for example, a longer side 21 in the embodiment) are faced each other, a dimension of the opening portion in the parallel direction to the opposite side (for example, a dimension L1 in the embodiment) is longer than a dimension of the opening portion of in the orthogonal direction to the opposite side (for example, a dimension L2 in the embodiment), the flange portion has a rectangular shape around the opening portion such that it has a pair of longer side portions which are parallel to the opposite side (for example, longer side portions 24 in the embodiment), and a pair of shorter side portions (for example, shorter side portions 25 in the embodiment) connecting each end portion (for example, end portions 24b in the embodiment) of the longer side portions, the longer side portion is fixed on the lid member with a fastening and fixing member (for example, a fastening and fixing member 61 in the embodiment) in a fastened and fixed portion (for example, a fastened and fixed portion 60 in the embodiment), the shorter side is positioned at the lid member in an engaging portion (for example, an engaging portion 50 in the embodiment), and the engaging portion has one or more engaging members (for example, engaging members 35 in the embodiment) formed on one of the lid member and the shorter side portion, and one or more engaging holes (for example, engaging holes 25a in the embodiment) into which the engaging member is inserted and engaged, and which are formed on other of the lid member and the shorter side portion.

The invention mentioned in Claim 2 is characterized in that the lid member has hinge portions (for example, hinge portions 33 in the embodiment) connecting the base portion with the door portion and serving as a turning fulcrum of the door portion, the hinge portion is formed with a tabular member (for example, a first plate portion 44 and a second plate portion 45 in the embodiment) bent in a cross-sectional V shape, extended in the parallel direction to the opposite side, and disposed in further inner direction of the opening portion than the fastened and fixed portion in the orthogonal view of the plane which is parallel to the opening portion.

The invention mentioned in Claim 3 is characterized in that the lid member has wall portions (for example, wall portions 34 in the embodiment) projecting from the base portion to the retainer, and the engaging members are formed integral with the wall portion.

The invention mentioned in Claim 4 is characterized in that the engaging member is made of resin and is formed in a cross shape in the cross-sectional view orthogonal to the projecting direction.

Effect of the Invention

According to the invention in Claim 1, the shorter side portion of the flange portion is positioned at the lid member due to the fact that the engaging member is engaged with the engaging hole. Accordingly, when the lid member is assembled with the retainer, the shorter side portion and the lid member can be easily positioned. Moreover, the longer side portion is fixed on the lid member with the fastening and fixing member. Accordingly, the mechanical strength of the fixing position between the longer side portion and the lid member can be enhanced due to the fact that the longer side portion is fixed on the lid member with the fastening and fixing member. Accordingly, the assembling strength of the lid member and the retainer can be enhanced. When the bag body is deployed, the longer side portion is more easily to be pressured than the shorter side portion. However, enhancing the strength of the longer side portion can enhance the shape stability of the lid member, the smooth deploying operation of the door portion becomes possible. Therefore, the inflation pressure of the bag body is locally applied, which can prevent the deformation of the lid member such that the opening is formed in a diamond shape (so-called fishmouth) and can stabilize the behavior of deploying operation of the bag body.

Furthermore, the retainer is tightly fixed on the lid member with the fastening and fixing member. Accordingly, when the vibration is added, the retainer and the lid member can be suppressed to move in the approaching and separating direction each other. Accordingly, the noise generated by the collision of the retainer and the lid member and the like can be suppressed.

According to the invention in Claim 1, the engaging portion is adopted such that the engaging member is inserted into and engaged with the engaging hole, the engaging structure between the shorter side portion of the flange portion and the lid member becomes simple, which enables to reduce the component number. Accordingly, the production becomes easy and can be enhanced the productivity.

Moreover, the engaging portion is adopted. Accordingly, the engaging portion can receive the pressure generated by the inflation of the bag body when the bag body is deployed. Therefore, the shape stability of the lid member can be enhanced and the smooth deploying operation of the door portion becomes possible, which can stabilize the behavior of deploying operation of the bag body.

According to the invention in Claim 2, the hinge portion is disposed in further inner direction of the opening portion than the fastened and fixed portion in the plain view, which enables to downsize the air bag device in the orthogonal direction to the opposite side compared to the case that the hinge portion is disposed in the outer direction of the opening portion than the fastened and fixed portion.

According to the invention in Claim 3, the engaging members are formed integral with the wall portion, which prevents the engage portion from deforming and enhances the mechanical strength of the engaging portion. Accordingly, the engaging portion can receive the pressure generated by the inflation of the bag body when the bag body is deployed. Therefore, the shape stability of the lid member can be enhanced and the smooth deploying operation of the door portion becomes possible, which can stabilize the behavior of deploying operation of the bag body.

According to the invention in Claim 4, the cross section of the engaging member is formed in a cross shape, which reduces the thick part thereof. Accordingly, the lid member can be prevented from deforming by a sink mark generated due to mold shrinkage.

DETAILED DESCRIPTION OF THE INVENTION

Next, the embodiment of the present invention will be explained based on the drawings. Moreover, the directions such as "front and rear", "upper and lower", and "right and left" in the following explanation are same as the directions of the vehicle, without any specific description.

[Air Bag Device]

Figure 1:
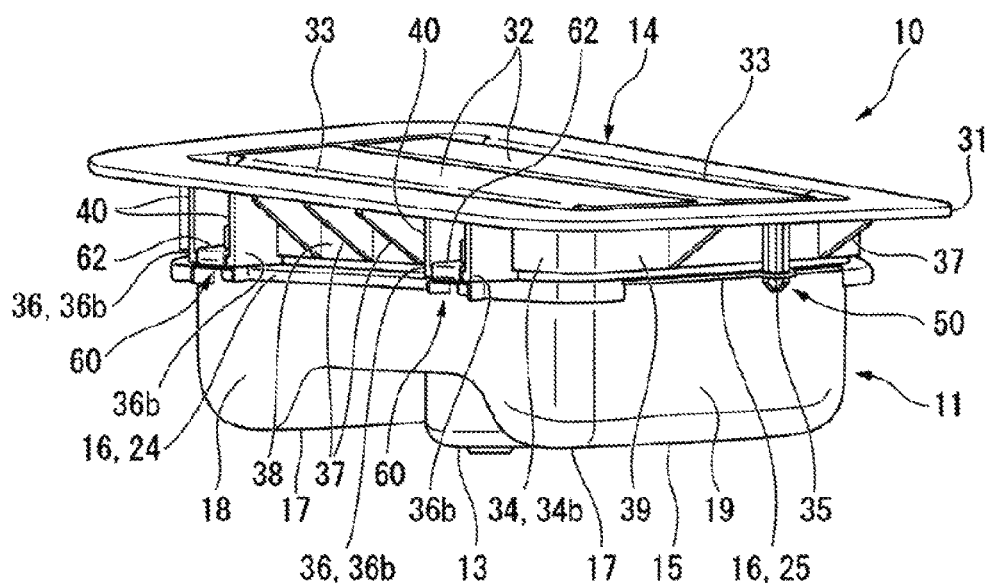
FIG. 1 is a perspective view of the air bag device related to the embodiment.
Figure 2:
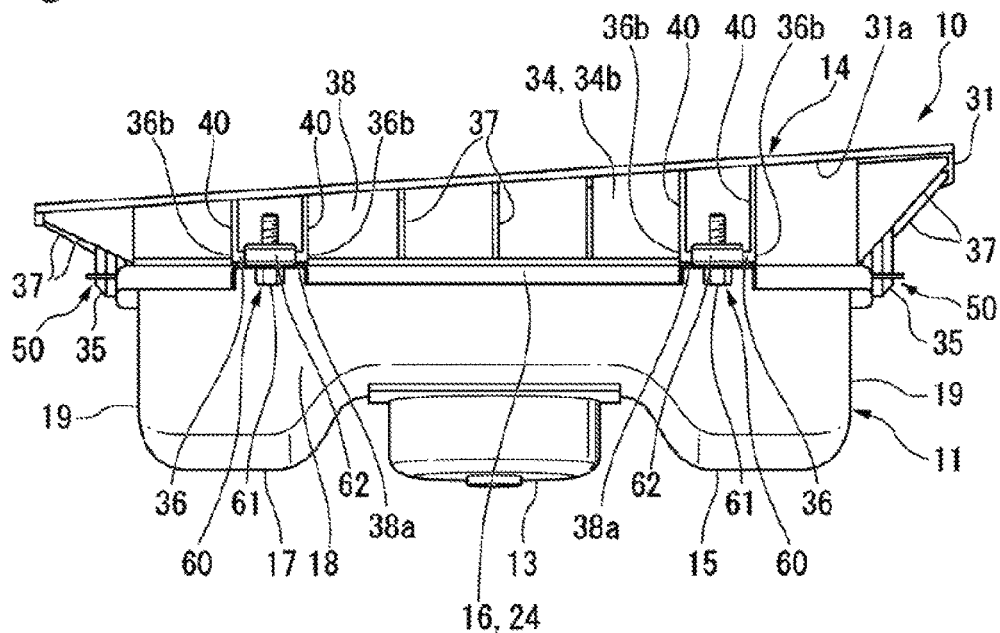
FIG. 2 is a front view of the air bag device related to the embodiment.
Figure 3:
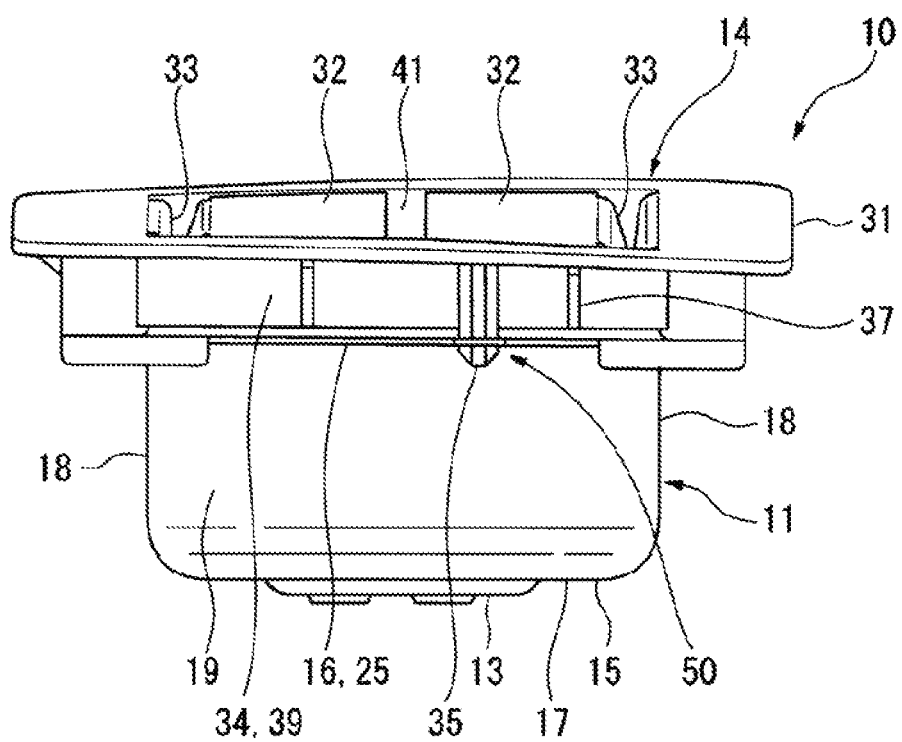
FIG. 3 is a side view of the air bag device related to the embodiment.
Figure 4:
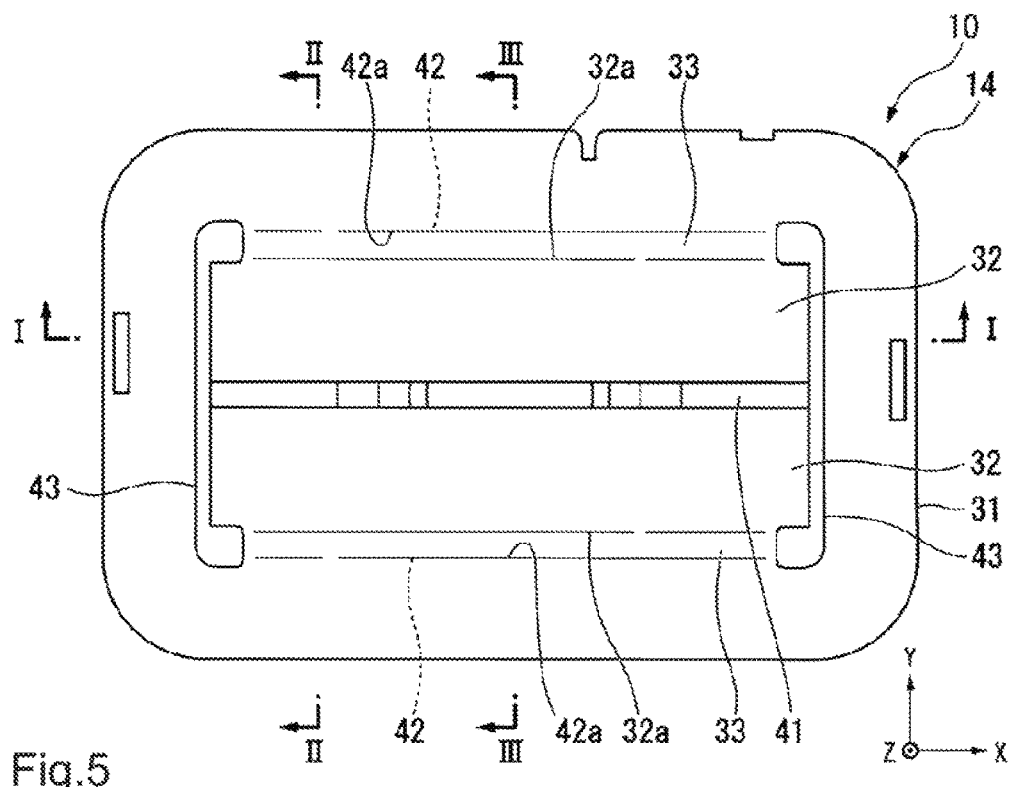
FIG. 4 is a plain view of the air bag device related to the embodiment.
Figure 5:
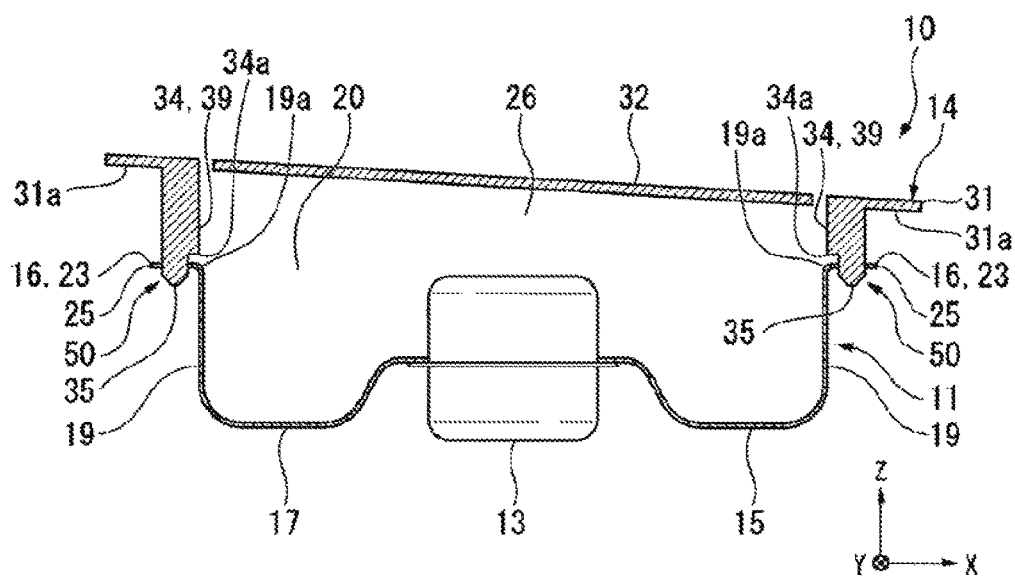
FIG. 5 is a sectional view corresponding to a I-I line in FIG. 4.
Figure 6:
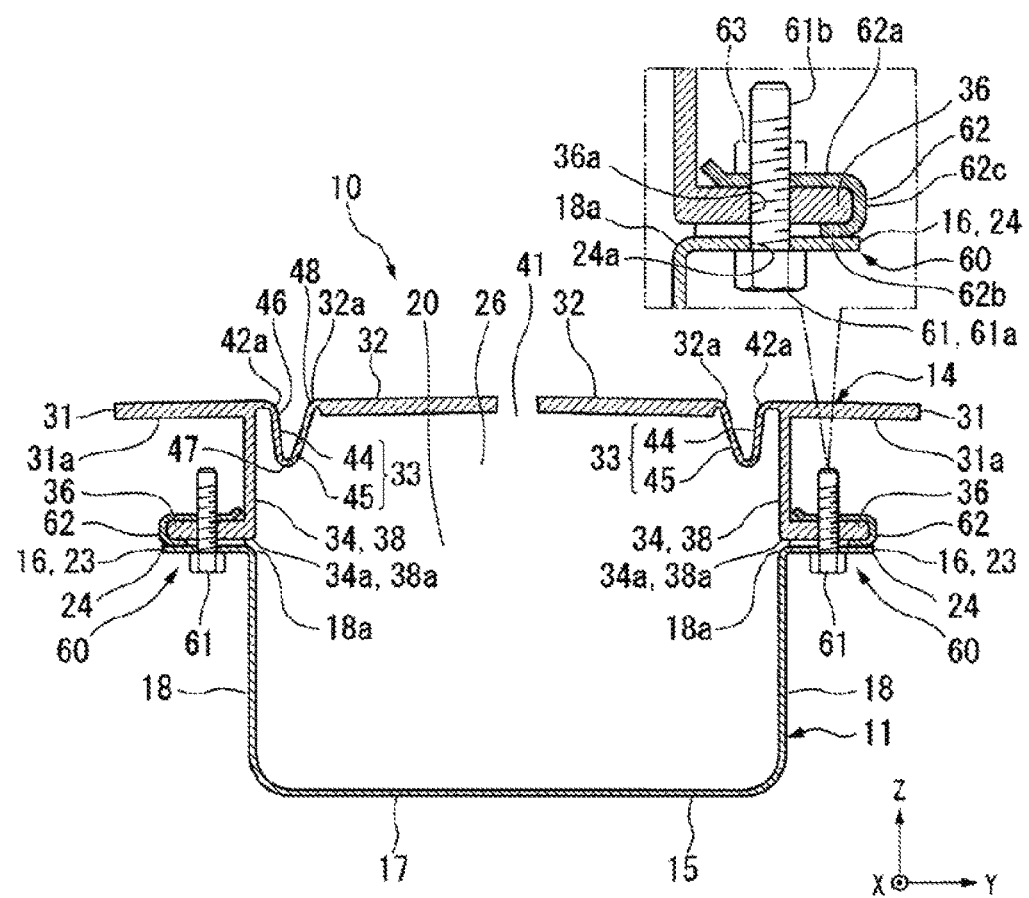
FIG. 6 is a sectional view corresponding to a II-II line in FIG. 4.
Figure 7:
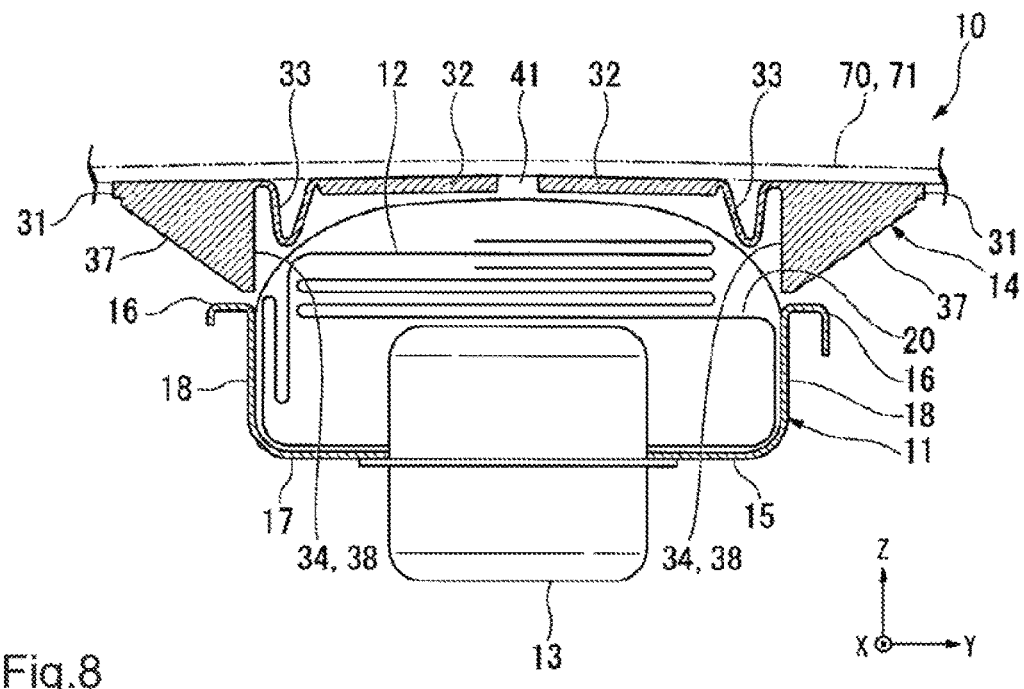
FIG. 7 is a sectional view corresponding to a III-III line in FIG. 4.
Figure 8:
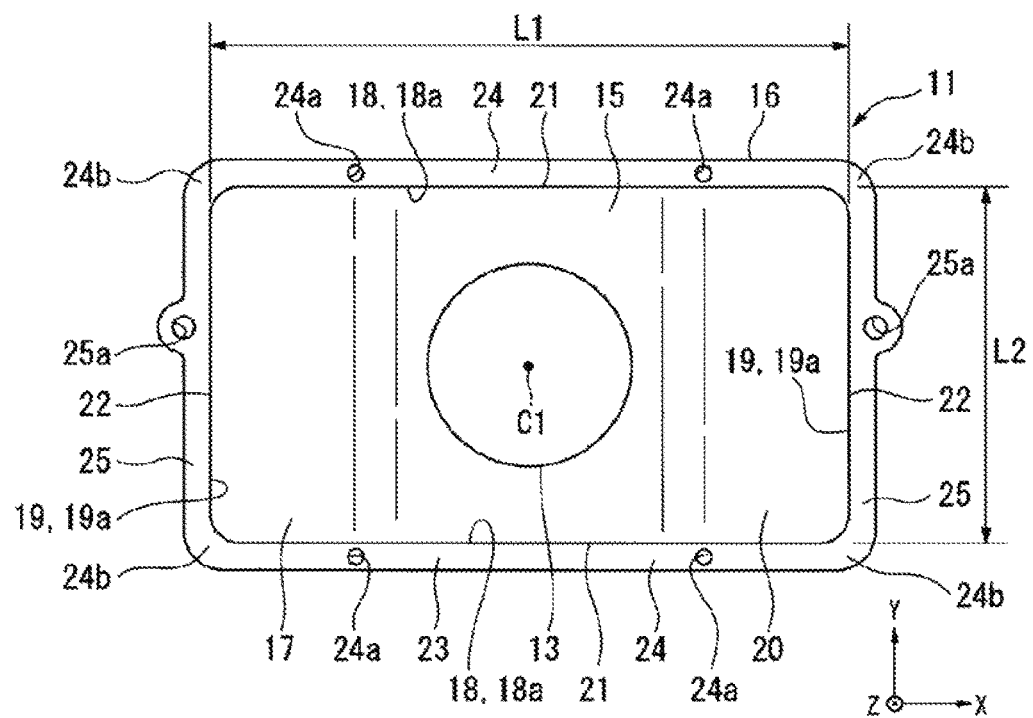
FIG. 8 is a plain view of the retainer of the air bag device related to the embodiment.

FIG. 1 is the perspective view of the air bag device 10 in the present embodiment. FIG. 2 is the front view of the air bag device 10. FIG. 3 is the side view of the air bag device 10. FIG. 4 is the plain view of the air bag device 10. FIG. 5 is the sectional view corresponding to the I-I line in FIG. 4. FIG. 6 is the sectional view corresponding to the II-II line in FIG. 4. FIG. 7 is the sectional view corresponding to the III-III line in FIG. 4. FIG. 8 is the plain view of the retainer 11 of the air bag device 10. For example, the air bag device 10 is an air bag device for passenger seat. The air bag device 10 is mounted on the inside of a passenger seat side upper surface panel 71 of an instrument panel 70 (see FIG. 7.), and on the corresponding position to the passenger seat.

As shown in FIGS. 1 to 7, the air bag device 10 mainly has the retainer 11, a bag body 12 (an air bag body), an inflator 13, and the lid member 14.

The retainer 11 holds the bag body 12 and the inflator 13, and simultaneously is fixed with the vehicle body at the inside of the instrument panel 70.

As shown in FIGS. 5, 6, and 8, the retainer 11 mainly has an inner space 15 and a flange portion 16.

The inner space 15 is formed in a box shape which is opened to the upper direction (the deploying direction of the bag body 12). In detail, the inner space 15 has a bottom wall portion 17, a side wall portion 18 and an end wall portion 19 which stand on the peripheral edge of the bottom wall portion 17. The bottom wall portion 17 has a rectangular shape in the plain view. The side wall portion 18 stands on the corresponding part to the longer side of a peripheral edge of the rectangular bottom wall portion 17. The end wall portion 19 stands on the corresponding part to the shorter side of the peripheral edge of the bottom wall portion 17.

As shown in FIG. 8, an upper opening of the inner space 15 is an opening portion 20. The opening portion 20 is formed with an upper end edge 18a of the side wall portion 18 and an upper end edge 19a of the end wall portion 19 and has a rectangular shape in the plain view.

Moreover, FIG. 8 is a view in the perpendicular direction to the plane parallel to the opening portion 20. For example, the plane parallel to the opening portion 20 is a plane including the upper end edge 18a of the side wall portion 18 and the upper end edge 19a of the end wall portion 19. The plane view means a view in the perpendicular direction to the plane parallel to the opening portion 20.

The opening portion 20 has a shape including a pair of linear longer sides 21, 21 (opposite sides) which are parallel to upper end edges 18a, 18a of the side wall portions 18, 18, a pair of linear shorter sides 22, 22 which are parallel to upper end edges 19a, 19a of the end wall portions 19, 19.

An X direction means the parallel direction to the longer side 21, A Y direction means the orthogonal direction to the longer side 21 in the plane which is parallel to the opening portion 20. For example, the X direction is in the width direction of the vehicle. For example, the Y direction is in the longitudinal direction. A Z direction means the perpendicular direction to the X direction and the Y direction, for example, the vertical direction. Moreover, the lid member 14 is positioned above the retainer 11 in the present embodiment.

The pair of the longer sides 21, 21 are parallel to the Y direction (the longitudinal direction) and faces each other with interval. The pair of the shorter sides 22, 22 are parallel to the X direction (in the width direction of the vehicle) and faces each other with interval. The shorter side 22 is parallel to the orthogonal direction to the longer side 21 (the Y direction). A dimension L1 in the X direction of the opening portion 20 (for example, a maximum dimension in the X direction) is longer than a dimension L2 in the Y direction of the opening portion 20 (for example, maximum dimension in the Y direction).

Moreover, the shorter side 22 is formed so as to be parallel to the Y direction in the present embodiment. However, the shorter side of the opening portion may be inclined to the Y direction. The shorter side of the opening portion may not only be limited in a straight line but also in a bent shape or in a curved shape.

The flange portion 16 is extended from the upper end edge 18a of the side wall portion 18 and the upper end edge 19a of the end wall portion 19 (the peripheral edge of the opening portion 20 of the inner space 15) to the outer direction of the opening portion 20 in the plain view. In detail, as shown in FIGS. 5 and 6, the flange portion 16 has a main portions 23 extending to the separating direction from the opening portion 20 (the outer direction of the opening portion 20) so as to be parallel to the plane (XY plane) which is parallel to the opening portion 20.

As shown in FIG. 8, the flange portion 16 has a rectangular shape which has the pair of longer side portions 24, 24 which are parallel to the longer sides 21, 21 of the opening portion 20, and the pair of shorter side portions 25, 25 which connects end portions 24b, 24b of the longer side portions 24, 24 in the plain view. The shorter side portions 25, 25 are formed so as to be parallel to the shorter sides 22, 22 of the opening portion 20. A length of the longer side portion 24 (a length in the X direction) is longer than a length of the shorter side portion 25 (a length in the Y direction).

Fastening holes 24a are formed on the longer side portions 24, 24 such that below-mentioned fastening and fixing members 61 can be inserted. In the present embodiment, the plurality of the fastening holes 24a are respectively formed on the longer side portions 24, 24 in the length direction (the X direction) with interval. For example, the shape of the fastening hole 24a is circular in the plane view. Each longer side portion 24 may have the single fastening hole 24a or the plurality of fastening holes (for example 2 to 4).

Engaging holes 25a are formed on the shorter side portions 25, 25 such that below-mentioned engaging members 35 are inserted and engaged. For example, the shape of the engaging hole 25a is circular in the plane view. Each shorter side portion 25 may have the single engaging hole 25a or the plurality of engaging holes (for example 2 to 4). The engaging hole 25a may be positioned closer to the one end portion of the shorter side portions 25 than the center thereof in the length direction.

For example, the retainer 11 is formed by press working and the like. As shown in FIG. 7, the bag body 12 is housed in the inner space 15 in a folded state. The inflator 13 is fixed on the bottom wall portion 17 of the inner space 15. The inflator 13 inflates and deploys the bag body 12 by supplying a gas into the bag body 12. The inflator 13 is fixed on the bottom wall portion 17 in a state that the inflator 13 penetrates the bottom wall portion 17 in the vertical direction.

As shown in FIGS. 1 to 7, the lid member 14 has the base portion 31, the door portion 32, the hinge portion 33, the wall portion 34, the engaging member 35, an extended portion 36, and a reinforcing lib 37.

As shown in FIGS. 1 and 4, the base portion 31 has a rectangular frame-shaped tabular member, and a rectangular opening portion 41 on the center. As shown in FIG. 4, the opening portion 41 has a rectangular shape with longer sides 42, 42 which are parallel to the X direction and shorter sides 43, 43 which are parallel to the Y direction, in the plain view. It is preferable that the opening portion 41 is disposed at the approximately same position of the opening portion 20 of the retainer 11, in the plain view.

As shown in FIGS. 4 and 6, the door portion 32 is formed so as to be tabular, to be connected to the base portion 31, and to openably and closably close the opening portion 41. The lid member 14 covers the opening portion 20 of the retainer 11. Accordingly, the door portion 32 openably and closably close the opening portion 20 of the retainer 11.

As shown in FIG. 6, the door portion 32 is connected to the base portion 31 through the hinge portion 33. In detail, an outside edge 32a of the door portion 32 is connected to an inside edge 42a of the base portion 31 through the hinge portion 33. The inside edge 42a corresponds to the inside edge of the longer side 42 of the opening portion 41.

The hinge portion 33 is made of a tabular member bent in a cross-sectional V shape and serves as a turning fulcrum when the door portion 32 opens and closes. In detail, the hinge portion 33 has a long plate-like first plate portion 44 connected to the base portion 31, and a second plate portion 45 connected to the first plate portion 44 and the door portion 32.

The outside edge of the first plate portion 44 is connected to the inside edge 42a of the base portion 31, and the inside edge of the first plate portion 44 is connected to the outside edge of the second plate portion 45. The inside edge of the second plate portion 45 is connected to the outside edge 32a of the door portion 32.

A connected portion 46 between the base portion 31 and the first plate portion 44, a connected portion 47 between the first plate portion 44 and the second plate portion 45, and a connected portion 48 between the second plate portion 45 and the door portion 32 can easily bend and deform. Accordingly, the door portion 32 can pivot at the hinge portion 33 as a fulcrum between the closing position and the opening position opened to the outer direction shown in FIG. 6.

The hinge portion 33 extends parallel to the X direction in the plain view (see FIG. 4).

It is preferable that the hinge portion 33 is disposed in further inner direction of the opening portion 20 than the fastened and fixed portion 60 in the plain view. Accordingly, the air bag device 10 can be downsized in the Y direction, compared to the case that the hinge portion 33 is disposed in further outer direction of the opening portion 20 than the fastened and fixed portion 60.

It is preferable that the hinge portion 33 is disposed in further inner direction of the opening portion 20 than the engaging portion 50. Accordingly, the air bag device 10 can be downsized. Moreover, the further inner direction of the opening portion 20 in the plain view means that the position is closer to a center C1 of the opening portion 20.

As shown in FIGS. 5 and 6, the wall portion 34 is formed in a rectangular cylindrical shape, and is extended from the lower surface 31a of the base portion 31 to the lower direction. The wall portion 34 has a pair of side wall portions 38, 38 which are parallel to the longer sides 21, 21 of the opening portion 20, a pair of end wall portions 39, 39 which are parallel to the shorter sides 22, 22 of the opening portion 20. The wall portion 34 surrounds an upper space 26 of the opening portion 20 of the retainer 11.

It is preferable that the wall portion 34 is formed such that a tip edge 34a approaches and abuts on the flange portion 16 over the whole periphery.

The lid member 14 covers the opening portion 20 of the retainer 11, which closes the opening portion 20.

Figure 9:
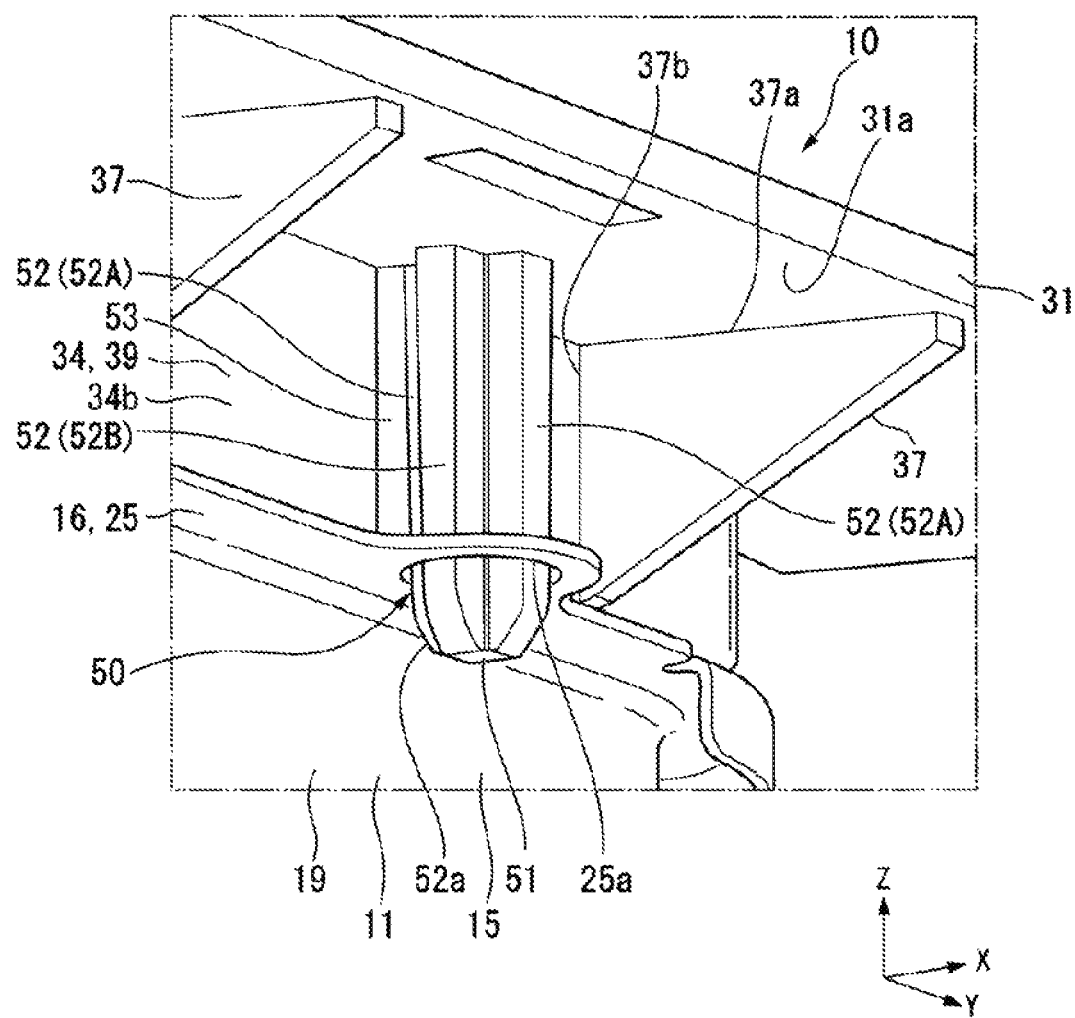
FIG. 9 is a perspective view showing the engaging portion of the air bag device related to the embodiment.
Figure 10:
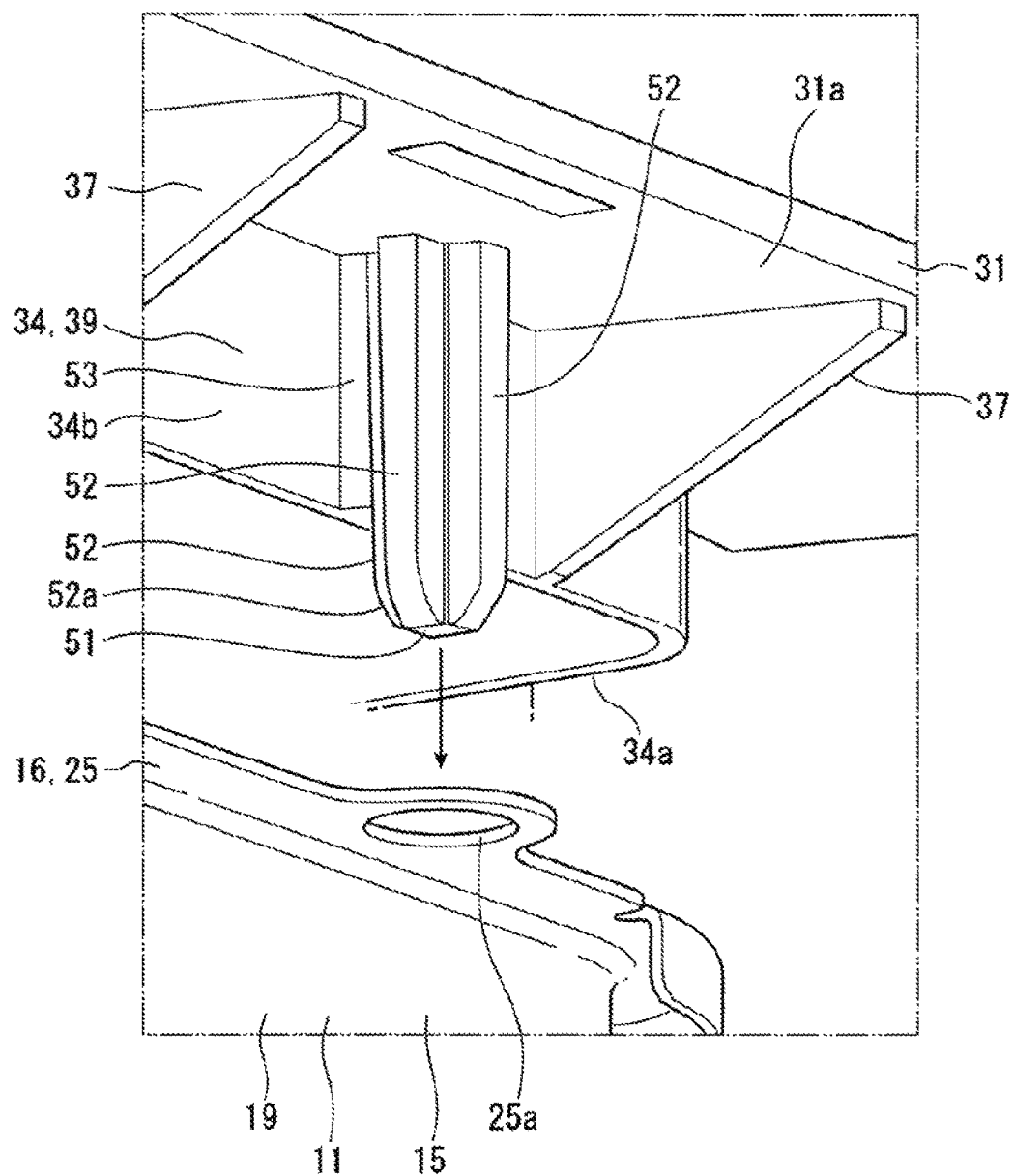
FIG. 10 is an exploded perspective view showing the engaging portion of the air bag device related to the embodiment.

FIG. 9 is the perspective view showing the engaging portion 50 of the air bag device 10. FIG. 10 is the exploded perspective view showing the engaging portion 50.

As shown in FIGS. 5, 9 and 10, the engaging member 35 is formed so as to project from the lower surface 31a of the base portion 31 to the lower direction.

As shown in FIGS. 9 and 10, the engaging member 35 is formed such that the cross section orthogonal to the projecting direction is formed in a cross shape. In detail, the engaging member 35 has a rectangular column-shaped main portion 51 in a rectangular cross section, and an extended convex portion 52 formed so as to perpendicularly project to the outer direction on each four side surfaces of the main portion 51, respectively. The extended convex portion 52 is a convex portion in a rectangular cross section over the full length of the main portion 51. The heights of the four extended convex portions 52 can be same, respectively. The two of the four extended convex portions 52, 52 project to the X direction, the other two of the extended convex portions 52, 52 project to the Y direction. The engaging member 35 has a cross shape in the cross-sectional view due to the fact that the extended convex portion 52 has a cross-sectional shape so as to project from the rectangular main portion 51 to the four directions.

Accordingly, the engaging member 35 is formed in a cross shape, which reduces the thick part thereof. Accordingly, the lid member 14 can be prevented from deforming due to the fact that mold shrinkage is less likely to generate a sink mark.

A tip portion 52a of the extended convex portion 52 is formed such that the projection height from the main portion 51 to the lower direction becomes gradually lower.

The extended convex portions 52, 52 of the four extended convex portions 52 which project parallel to the X direction are shown as convex portions 52A, 52A, and the other two of the extended convex portions 52, 52 are shown as convex portions 52B, 52B. One of the extended convex portion 52A which projects to the wall portion 34 of the two extended convex portions 52A, 52A is connected to an outer surface 34b of the wall portion 34 (an end wall portion 39) with a connecting portion 53 over the length direction. The connecting portion 53 is vertically extended from the lower surface 31a of the base portion 31 to the tip edge 34a of the wall portion 34.

The connecting portion 53 connects the engaging member 35 to the wall portion 34, which prevents the engaging member 35 from deforming. Accordingly, the mechanical strength of the engaging portion 50 can be enhanced.

Therefore, the engaging portion 50 can receive the pressure generated by the inflation of the bag body 12 when the bag body 12 is deployed. Therefore, the shape stability of the lid member 14 can be enhanced and the smooth deploying operation of the door portion 32 becomes possible, which can stabilize the behavior of deploying operation of the bag body 12.

The engaging member 35 is inserted into and engaged with the engaging hole 25a formed on the flange portion 16 of the retainer 11 in the engaging portion 50. For example, the four outer surfaces of the extended convex portion 52 abut on the inner peripheral edge of the engaging hole 25a when the engaging member 35 is inserted into the engaging hole 25a. Accordingly, the engaging member 35 is suppressed to move within the XY plane relative to the engaging hole 25a.

The maximum external dimension of the engaging member 35 is designed so as to match the inner diameter of the engaging hole 25a. Namely, the maximum external dimension of the engaging member 35 is designed so as to engage with the engaging hole 25a in a state that the engaging member 35 is inserted into the engaging hole 25a.

The engaging member 35 is positioned so as to be inserted into the engaging hole 25a in the plane view. The projection length of the engaging member 35 is longer than the projection length of the wall portion 34. The shorter side portions 25, 25 of the flange portion 16 are positioned relative to the lid member 14 due to the fact that the engaging member 35 is engaged with the engaging hole 25a.

It is preferable that the engaging member 35 is made of resin. The engaging member 35 is integrally molded with the base portion 31 and the wall portion 34.

The reinforcing lib 37 is formed from the lower surface 31a of the base portion 31 to the outer surface 34b of the wall portion 34. The reinforcing lib 37 is a plate member in a triangular shape. An upper end edge 37a and an inside edge 37b are joined to the lower surface 31a of the base portion 31 and the outer surface 34b of the wall portion 34, respectively. It is preferable that the reinforcing lib 37 is formed so as to be parallel to the vertical direction.

The plurality of the reinforcing libs 37 are provided with interval in the circumferential direction of the base portion 31 and the wall portion 34.

As shown in FIGS. 2 and 6, the extended portion 36 is formed in a long plate-like and rectangular shape parallel to the XY plane in the plane view, so as to extend from tip edges 38a, 38a of the side wall portions 38, 38 to the outer direction, respectively.

The extending direction of the extended portion 36 is the direction separating from the side wall portions 38, 38 so as to be perpendicular to the side wall portions 38, 38. The outer direction of the side wall portions 38, 38 is the direction separating the side wall portions 38, 38 from each other. For example, the extended portions 36 are formed on the one place or the plurality of places of tip edges 38a, 38a of the side wall portions 38, 38. For example, as shown in FIG. 2, each two extended portions 36 can be formed on the pair of side wall portions 38, 38 with interval in the X direction. For example, each side wall 38 has the two to four extended portions.

As shown in FIG. 6, the fastening hole 36a is formed on the extended portion 36 such that a screw shaft portion 61b of the fastening and fixing member 61 can be inserted. For example, the fastening hole 36*a* has a circular shape in the plane view.

As shown in FIGS. 1 and 2, a lower end edge of reinforcing plates 40, 40 are respectively joined to side edges 36*b*, 36*b* of the extended portion 36 over the whole length of the extended portion 36, which reinforces the extended portion 36. The reinforcing plate 40 is formed from the lower surface 31*a* of the base portion 31 to outer surface 34*b* of the wall portion 34.

The reinforcing plate 40 is a rectangular plate member, and is perpendicularly formed on the outer surface 34*b* of the wall portion 34. The reinforcing plate 40 is formed such that the upper end edge thereof is joined to the lower surface 31*a* of the base portion 31, and the inside edge thereof is joined to outer surface 34*b* of the wall portion 34.

The pair of the reinforcing plates 40, 40 joined to the side edges 36*b*, 36*b* of the extended portion 36 are parallel to each other and is formed with interval in the thickness direction.

As shown in FIGS. 1, 2, and 6, an assembling member 62 is installed on the extended portion 36.

As shown in FIG. 6, the assembling member 62 has a first plate portion 62*a*, a second plate portion 62*b*, and a connected portion 62*c*.

The first plate portion 62*a* is layered on the one surface (upper surface) of the extended portion 36. The second plate portion 62*b* is layered on the other surface (lower surface) of the extended portion 36. The connecting portion 62*c* connects the end portion of the first plate portion 62*a* and the end portion of second plate portion 62*b*.

The extended portion 36 is fixed on the longer side portions 24, 24 of the flange portion 16 of the retainer 11 with the fastening and fixing member 61 in the fastened and fixed portion 60.

The fastening and fixing member 61 has a head portion 61*a* and the screw shaft portion 61*b* extended from the head portion 61*a*.

The screw shaft portion 61*b* of the fastening and fixing member 61 is inserted into the fastening hole 24*a* formed on the longer side portion 24 of the flange portion 16, the fastening hole 36*a* of the extended portion 36, and an insertion hole of the first plate portion 62*a*. For example, the screw shaft portion 61*b* is screwed into the insertion hole of the first plate portion 62*a* of the assembling member 62. Accordingly, the longer side portion 24 is fastened and fixed on the extended portion 36. Moreover, the screw shaft portion 61*b* may be screwed into a nut 63 of the first plate portion 62*a* in the upper surface side.

[Assembling Work of Air Bag Device]

As shown in FIG. 10, in order to assemble the air bag device 10, when the lid member 14 is lowered than the retainer 11 and the lid member 14 closes the opening portion 20 of the retainer 11, the engaging member 35 is inserted into and engaged with the engaging hole 25*a* of the flange portion 16. The engaging member 35 can be engaged with the engaging hole 25*a* by only inserted into the engaging hole 25*a*, which makes easier to position the lid member 14 relative to the retainer 11.

Next, the fastening and fixing member 61 fixes the longer side portion 24 of the flange portion 16 of the retainer 11 on the extended portion 36 of the lid member 14. Accordingly, the air bag device 10 is achieved as shown in FIG. 1 and the like.

In the present embodiment, the shorter side portion 25 of the flange portion 16 is positioned at the lid member 14 due to the fact that the engaging member 35 is engaged with the engaging hole 25*a*. Accordingly, when the lid member 14 is assembled with the retainer 11, the shorter side portions 25 and the lid member 14 can be easily positioned.

Moreover, the mechanical strength of the fixing position of the longer side portion 24 and the lid member 14 can be enhanced due to the fact that the longer side portion 24 is fixed on the lid member 14 with the fastening and fixing member 61. Accordingly, the assembling strength of the lid member 14 and the retainer 11 can be enhanced. When the bag body 12 is deployed, the longer side portion 24 is likely to be pressured than the shorter side portion 25. However, enhancing the strength of the longer side portion 24 can enhance the shape stability of the lid member 14. The smooth deploying operation of the door portion 32 becomes possible.

Therefore, the inflation pressure of the bag body 12 is locally applied, which can prevent the deformation of the lid member 14 such that the opening 41 is formed in a diamond shape (so-called fishmouth) and can stabilize the behavior of deploying operation of the bag body 12.

Furthermore, the retainer 11 is tightly fixed on the lid member 14 with the fastening and fixing member 61. Accordingly, even if the vibration is added, the retainer 11 and the lid member 14 can be suppressed to move in the direction for approaching and separating from each other. Accordingly, the noise generated by the collision of the retainer 11 and the lid member 14 and the like can be suppressed.

In the present embodiment, the engaging portion 50 is adopted such that the engaging member 35 is inserted into and engaged with the engaging hole 25*a*, the engaging structure between the shorter side portion 25 of the flange portion 16 and the lid member 14 becomes simple, which enables to reduce the component number. Accordingly, the production becomes easy and can enhance the productivity.

Moreover, the engaging portion 50 is adopted. Accordingly, the engaging portion 50 can receive the pressure generated by the inflation of the bag body 12 when the bag body 12 is deployed. Therefore, the shape stability of the lid member 14 can be enhanced and the smooth deploying operation of the door portion 32 becomes possible, which can stabilize the behavior of deploying operation of the bag body 12.

Moreover, the scope of the art in the present invention is not limited to the above-mentioned embodiments, respectively, and includes various modifications to the embodiments within the scope of the present invention. Namely, the configurations and the like according to the above-mentioned embodiments are only examples, and can be adequately changed. For example, as shown in FIG. 6, the engaging portion 50 has the engaging member 35 projecting from the lid member 14 to the flange portion 16, and the engaging hole 25*a* formed on the flange portion 16. However, the configuration of the engaging portion is not limited to this.

For example, it may be the configuration that the engaging portion has an engaging member formed on the flange portion, an engaging hole formed on the lid member, and the engaging member is inserted into and engaged with the engaging hole.

As shown in FIG. 8, the opening portion 20 of the retainer 11 is formed in a rectangular shape which has the longer sides 21, 21 (opposite sides), and the shorter sides 22, 22. However, the shape of the opening portion of the retainer is not limited to a rectangular shape, if the dimension (for example, the maximum dimension) of the opening portion in the parallel direction to the opposite side is larger than the dimension (for example, the maximum dimension) of the opening portion in the orthogonal direction to the opposite side.

The above-mentioned embodiment explains the case of the air bag device 10 for passenger seat applying the present invention. The configuration in the present invention can be applied to other air bag devices except the one for passenger seat.

Additionally, within the scope of the present invention, the components in the above-mentioned embodiment can be adequately replaced by well-known components. Moreover, the above-mentioned variations can be adequately combined.

DESCRIPTION OF REFERENCE NUMERALS

10 . . . air bag device 11 . . . retainer 12 . . . bag body (air bag body) 13 . . . inflator 14 . . . lid member 15 . . . inner space 16 . . . flange portion 18a . . . upper end edge of side wall portion (peripheral edge of opening portion) 19a . . . upper end edge of end wall portion (peripheral edge of opening portion) 20 . . . opening portion 21 . . . longer side (opposite side) 24 . . . longer side portion 24a . . . fastening hole 24b . . . end portion of longer side portion 25 . . . shorter side portion 25a . . . engaging hole 31 . . . base portion 32 . . . door portion 33 . . . hinge portion 34 . . . wall portion 35 . . . engaging member 50 . . . engaging portion 53 . . . connecting portion 60 . . . fastened and fixed portion 61 . . . fastening and fixing member X . . . direction parallel to opposite side Y . . . direction orthogonal to opposite side L1 . . . dimension of opening portion in parallel direction to opposite side L2 . . . dimension of opening portion in orthogonal direction to opposite side

The invention claimed is:

1. An air bag device comprising:
   an air bag body;
   a retainer having an inner space with an opening in which said air bag body is housed, said retainer having a flange portion formed along a peripheral edge of said opening such that said flange portion protrudes outwards from said peripheral edge of said opening generally in a horizontal direction and surrounds said opening by extending along the entire peripheral edge of said opening; and
   a lid member fixed to said retainer at said flange portion and configured to close said opening of said retainer, said lid member having a base portion which approaches or abuts a periphery of said flange portion along the entire peripheral edge of said opening and a door portion pivotally connected to said base portion, wherein
   said opening of said retainer has a pair of opposite shorter sides facing each other in one direction and a pair of opposite longer sides facing each other in another direction orthogonal to said one direction such that a dimension in said one direction between the opposite shorter sides is longer than a dimension in said another direction between said opposite longer sides,
   said flange portion of said retainer has a pair of longer side portions which extend along said corresponding opposite longer sides of said opening and a pair of shorter side portions which connect respective end portions of said longer side portions by extending along said corresponding opposite shorter sides of said opening,
   said air bag device further comprises
   a fastening and fixing portion at which a fastening hole formed in said longer side portion of said flange portion is fastened and fixed to another fastening hole formed in said lid member in a corresponding position to said fastening hole with a fastening and fixing member in a manner that forms a fastening fixture between said fastening hole and said another fastening hole, and
   an engaging portion at which said shorter side portion of said flange portion is engaged with said lid member so as to determine a position of said lid member with respect to said flange portion, and
   said engaging portion comprises an engaging protrusion member protruding from said lid member and an engaging hole formed at said shorter side portion which extends generally in the horizontal direction such that said engaging protrusion member is inserted into said engaging hole and engaged with said engaging hole.

2. The air bag device according to claim 1, wherein
   said lid member has hinge portions connecting said base portion with said door portion in a manner that allows said door portion to pivot about the hinge portions, and
   said hinge portion is formed with a tabular member bent in a cross-sectional V shape, extended in a parallel direction to said pair of opposite longer sides, and disposed in a position inward than said fastening and fixing portion in a planar view of said opening.

3. The air bag device according to claim 1, wherein
   said lid member has a wall portion projecting from said base portion toward said retainer, the wall portion abutting the entire periphery of said flange portion and
   said engaging member is formed integral with said wall portion.

4. The air bag device according to claim 1, wherein said engaging member is made of resin and has a projecting body which is formed in a cross shape in a cross-sectional view orthogonal to a projecting direction of said projecting body.

5. The air bag device according to claim 1, wherein
   said lid member has a wall portion projecting from said base portion toward said retainer, said wall portion comprising a pair of side wall portions extending along said longer side portions and a pair of end wall portions extending along said shorter side portions such that said wall portion is formed in a rectangular cylindrical shape,
   said another fastening hole of said lid member is formed in an extended portion extending outwards from an end of side wall portions, and
   said engaging member is formed integral with said end wall portions.

* * * * *